United States Patent [19]

Tsunekawa et al.

[11] 4,122,467

[45] Oct. 24, 1978

[54] CAMERA WITH THE SHUTTER TIME CONTROL CIRCUIT FOR THE FLASH LIGHT PHOTOGRAPHY

[75] Inventors: Tokuichi Tsunekawa, Yokohama; Zenzo Nakamura, Urawa; Shohei Ohtaki; Nobuaki Sakurada, both of Yokohama; Masayuki Suzuki, Kawasaki; Takashi Uchiyama, Yokohama, all of Japan

[73] Assignee: Canon Kabushiki Kaisha, Tokyo, Japan

[21] Appl. No.: 739,097

[22] Filed: Nov. 5, 1976

[30] Foreign Application Priority Data

Nov. 11, 1975 [JP] Japan .................... 50-135403

[51] Int. Cl.² .................... G03B 7/08; G03B 15/05
[52] U.S. Cl. .................... 354/33; 354/51; 354/149
[58] Field of Search .................... 354/32, 33, 34, 50, 354/51, 139, 145, 149

[56] References Cited

U.S. PATENT DOCUMENTS

| 3,667,357 | 6/1972 | Matsuda | 354/33 |
| 3,675,547 | 7/1972 | Uchiyama et al. | 354/33 X |
| 3,974,509 | 8/1976 | Tsuda et al. | 354/51 |

*Primary Examiner*—Michael L. Gellner
*Attorney, Agent, or Firm*—Toren, McGeady and Stanger

[57] ABSTRACT

The present invention relates to a shutter time control circuit of the type in which the shutter time is changed over into a predetermined value for flash light photography in response to a flash charge completion signal from the flash light device. In order to eliminate the shortcoming of the conventional shutter time control circuit of this type, in that when the shutter time is changed over into the value predetermined for flash light photography predetermined shutter time is memorized in a memory capacitor for controlling the shutter time in accordance with the value memorized after the charge completion signal has disappeared.

18 Claims, 7 Drawing Figures

CAMERA WITH THE SHUTTER TIME CONTROL CIRCUIT FOR THE FLASH LIGHT PHOTOGRAPHY

FIELD OF THE INVENTION

The present invention relates to a shutter time control circuit for automatically adjusting the shutter time to a value suited for the flash photography when a flash unit is used, and more particularly to a shutter time control circuit which responds to charge of the main capacitor storing the flash energy for the flash unit.

DESCRIPTION OF THE PRIOR ART

In a conventional method the shutter time of the camera is automatically changed into one (1/60 sec.) suitable for flash photography when the camera has been switched from the daylight photographic mode into the flash mode. A charge signal is transmitted from the flash unit or device to the shutter time control circuit of the camera, the time being detected when the main condenser for storing the flash light energy for the flash light device has been charged up to a certain determined voltage. By making the above mentioned shutter time control circuit respond to the above mentioned charge signal the shutter time control circuit is automatically controlled with the shutter speed suited for the flash light photography. However, in case this conventional method the shutter time control circuit is controlled by means of the charge completion signal so as to obtain the shutter time value for the flash light photography. Thus, the shutter time control circuit returns to the daylight photographic mode when the charge signal has disappeared after the operation of the flash device and the maximum shutter time value controlled by the conventional method is the time during which the flash continues to be projected from the flash device. However, one may wish to take a picture with a comparatively long shutter time such as ¼ sec. so as to obtain the proper exposure of the auxiliary objects surrounding the main object illuminated with the flash light. It is then not possible to carry out synchronization photography in a dark place with conventional flash light photography. This is very inconvenient.

SUMMARY OF THE INVENTION

A purpose of the present invention is to offer a shutter time control circuit by means of which the shutter time of the camera is automatically changed over into the one for the flash photography by means of the charge completion signal from the flash device, while the shutter is controlled with the shutter time for the flash photography even after the charge completion signal has disappeared.

Another purpose of the present invention is to offer a shutter time control circuit by means of which an output corresponding to a certain determined shutter time suited for the flash light photography is produced by means of the charge completion signal so as to be memorized in a memory means in such a manner that the shutter time is controlled with the output memorized in the memory means no matter whether there is the charge completion signal or not. Hence flash photography during a comparatively long shutter time is made possible when a camera in the daylight photographic mode is automatically changed over into the flash light photography by means of the charge signal.

Further another purpose of the present invention is to offer a shutter time control circuit for the flash photography control suited for the camera with priority on the shutter time.

Further another purpose of the present invention is to offer a shutter time control circuit for the flash light photography suited for the camera with priority on the aperture value.

Further other purposes of the present invention will be disclosed out of the explanations to be made later in detail in accordance with the accompanying drawings.

DESCRIPTION OF PREFERRED EMBODIMENTS

Figure 1:
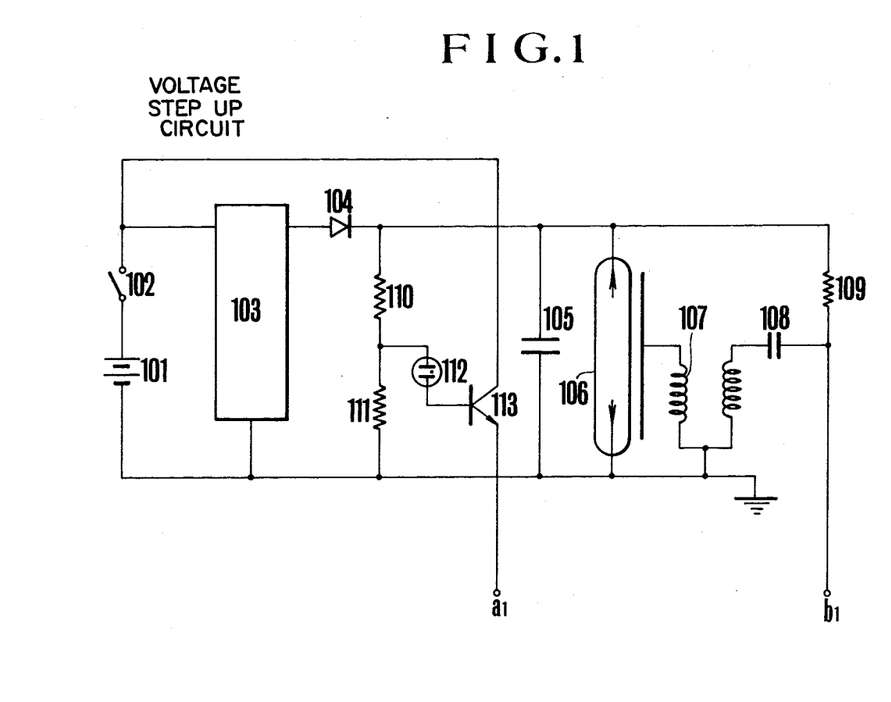
FIG. 1 shows a circuit diagram of an embodiment of the flash light device to be applied to the shutter time control circuit in accordance with the present invention.

FIG. 1 shows a circuit diagram of an embodiment of the flash unit to be applied to the shutter time control circuit in accordance with the present invention. Member 101 is a power source, member 102 a power source switch and 103 member a conventional voltage step up oscillation circuit for stepping up the voltage of the power source 101 so as to produce a high voltage current. Member 104 is a rectifying diode for rectifying the output of the voltage step up oscillation circuit, member 105 a flash light energy storing main condenser, member 106 a flash light discharge tube, member 107 a trigger coil and member 108 a trigger condenser constituting the trigger circuit together with the aforementioned trigger coil. Member 109 is a resistor, and members 110 and 112 the voltage dividing resistance for dividing the voltage between the both terminals of the main condenser 105 so as to be applied to the charge completion display neon tube. Member 113 is a transistor which switches on when the charge completion display neon tube 112 lights up, serving to control the charge completion display illuminating diode of the camera through the $a_1$ terminal. Member $b_1$ is a terminal to be connected to the synchronization contact of the camera, whereby when the synchronization contact is closed the excitation voltage is applied to the discharge tube 106 through the trigger coil 107 producing a flash light.

Figure 2:
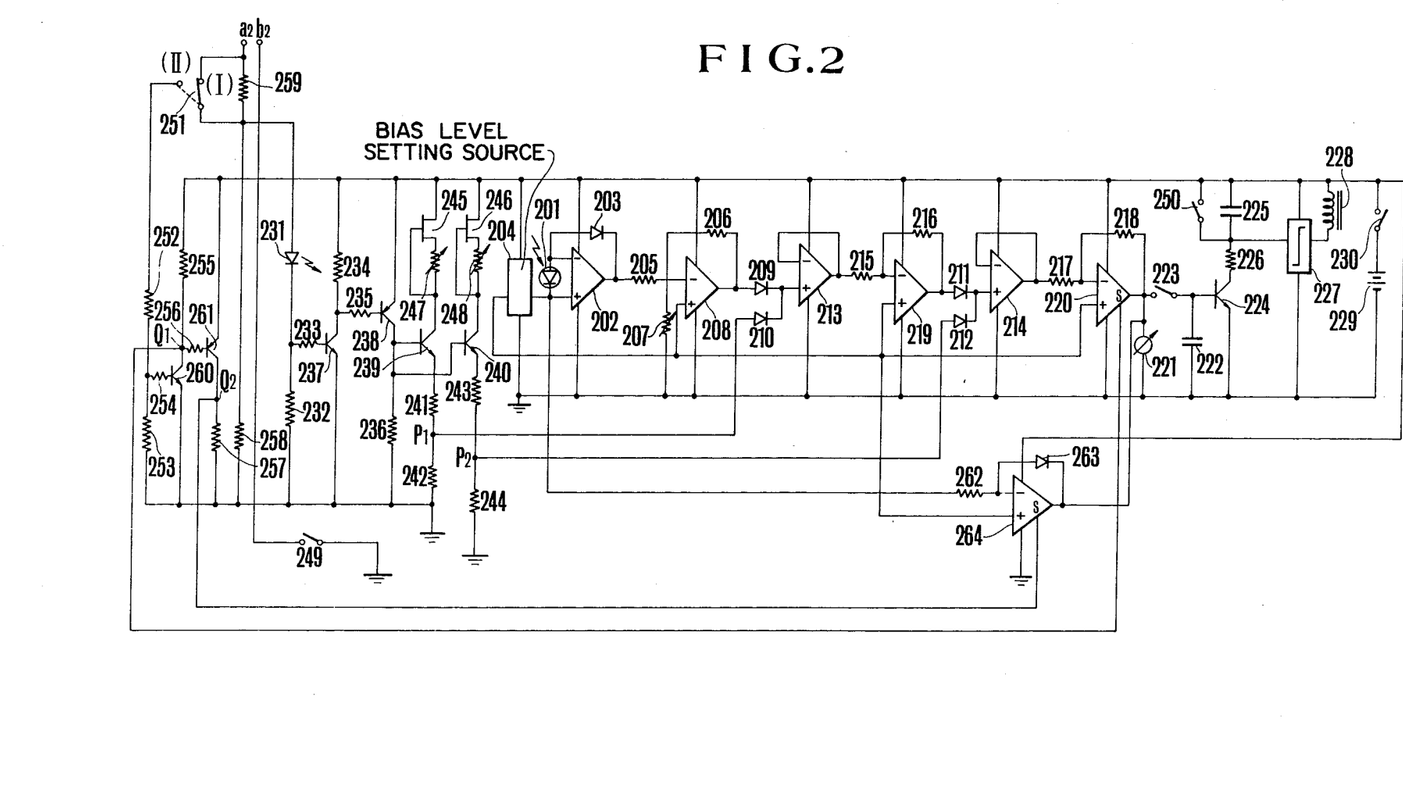
FIG. 2 shows a circuit diagram of an embodiment of the shutter time control circuit in accordance with the present invention.

FIG. 2 shows a circuit diagram of an embodiment of the shutter time control circuit in accordance with the present invention. This embodiment relates to an aperture value priority shutter time control circuit. Members 201 – 205 constitute a light measuring circuit, whereby member 201 is a photo voltaic transducing element for sensing the light beam coming through the photographic lens from the object. Member 202 is a high input impedance operational amplifier (hereinafter called operational amplifier). Member 203 is a logarithmically compressing element such as a diode, connected between the input and the output terminal of the operational amplifier 202. Member 204 is a bias level setting constant voltage source which applies the bias voltage to the aforementioned operational amplifier 202. Member 205, connected to the output terminal of the operational amplifier 202, is a resistor, whereby the aforementioned light measuring circuit delivers the voltage presenting an output level corresponding to the logarithmically compressed value of the object light incident to the photoelectric transducing element 201 through the photographic lens. Because the output of the light measuring circuit corresponds to the object light through the photographic lens with the totally opened diaphragm, it is the voltage corresponding to the value Bv−Avo−Avc, the resultant of the object brightness Bv, the smallest F value of the photographic lens Avo and the vignetting error Avc due to the character of the lens in the light measuring optical system. Members 206 − 220 constitute an operational circuit while member 208 is an operational amplifier of which one input terminal is connected to the output terminal of the aforementioned light measuring circuit. Member 207 is an information input variable resistor connected to the input terminal of the aforementioned operational amplifier, so designed that the resistance value corresponds to SV−Av+Avo+Avc, the resultant of the film sensitivity Sv and the aperture value respectively set in functional engagement with the aperture value setting ring and the film sensitivity setting dial not shown in the drawing, and Avo and Avc set in functional engagement with the smallest F value of the photographic lens. Member 206 is a resistor connected between the input and the output terminal of the operational amplifier 208. Member 209, 210, 211 and 212 are diodes. Members 213 and 214 constitute a buffer operational amplifier, and members 215, 216, 217 and 218 are resistors. Members 219 and 220 the constitute signal inversing operational amplifier, whereby 220 is the operational amplifier presenting a switching efficiency in accordance with the bias level. Member 221 is a shutter time display meter for displaying the operated output of the operational circuit, namely the shutter time. Members 222 − 228 constitute a shutter time control circuit, whereby 222 is the memory condenser for memorizing the output of the operational circuit, while 223 is the memory switch to be opened in functional engagement with the mirror elevation operation and so on of the conventional mirror elevation mechanism, not shown in the drawing. Member 224 is an actual time extending transistor for extending the value memorized in the condenser member 222, 225 a time integrating condenser, member 226 the protection resistor of a transistor 224, and member 227 the level detector consisting of the Schmitt-trigger circuit and so on. Member 228 is a the rear shutter plane control magnet and member 250 a time constant switch which opens in functional engagement with the front shutter plane not shown in the drawing. Members 231 − 264 constitute the control circuit for charging the aforementioned memory condenser with the voltage corresponding to the shutter time suited for the flash photography, whereby $a_2$ and $b_2$ are the terminals at the side of the camera to be connected to the terminals $a_1$ and $b_1$ of the flash unit shown in FIG. 1. Member 251 is a photographic mode switch in functional engagement of the operation member not shown in the drawing at the time of the flash photography, so designed that when the switch is connected to the contact (I) the shutter is controlled within a certain determined range of the shutter time while when the switch is connected to the contact (II) the shutter is controlled with a certain determined time. Member 231 is the charge completion display diode provided at the side of the camera and members 258 and 259 the voltage dividing resistors for dividing the charge completion signal voltage applied to the terminal $a_2$. Member 232 is a resistor to be connected to the connecting point of the aforementioned voltage dividing resistors through the aforementioned illuminating diode 231 and member 237 a transistor whose base is connected to the resistor 232 through the base resistor 233, so designed as to be switched on when the switch 251 is connected to the contact so as to be supplied with the charge completion signal. Members 234 and 235 are resistors, 238 and member is a switching transistor which switches on when the transistor 237 switches on. Member 236 is a resistor connected to the collector of the transistor 238. Members 239 and 240 are the transistors connected to the collector of the transistor 238, so designed to be switched on when the transistor 238 switches on. Members 245 and 246 are the field effect transistors (hereinafter called FET) respectively connected to the current adjusting resistors 247 and 248 so as to constitute a constant current circuit respectively, whereby the constant current circuits are respectively connected to the collectors of the aforementioned transistor 239 and 240. Members 241, 242, 243 and 244 are the bias level setting resistors, whose values are so chosen as to produce a voltage corresponding to the shutter time of ¼ sec. at the point $P_1$ and a voltage corresponding to the shutter time of 1/60 sec. at the point $P_2$ when the above mentioned transistors 239 and 240 are switched on. Members 252 and 253 are the voltage dividing resistors, so designed that when the switch 251 is connected to the terminal (II) a certain determined voltage is applied to the transistor 260 whose base is connected the those voltage dividing resistors, thus switching on the transistor 260. Member 261 is a transistor whose base is connected to the collector of the aforementioned transistor 260 through the base resistance 256. Members 254, 255 and 257 are resistors. Member 264 is an operational amplifier whose inversing input terminal is connected to the aforementioned constant voltage source 204 through the input resistor 262 with a resistance value corresponding to the information during a certain determined time (1/60 sec.) suited for the flash photography.

Member 263 is a diode connected between the input and the output terminals of the aforementioned operational amplifier 264. When the aforementioned transistor 261 is switched on, a certain determined voltage is applied to the terminal S for controlling the switching of the operational amplifier 264 so as to make it into the operative, i.e. enabled state. When the transistor 260 is switched on, the electrical potential at the terminal S of the operational amplifier 220 becomes almost "0" level (earth level) so that the operational amplifier 220 is brought into the inoperative i.e. disabled state. Member 230 is a power source switch, member 229 a power source and member 249 a synchronization switch.

Figure 6:
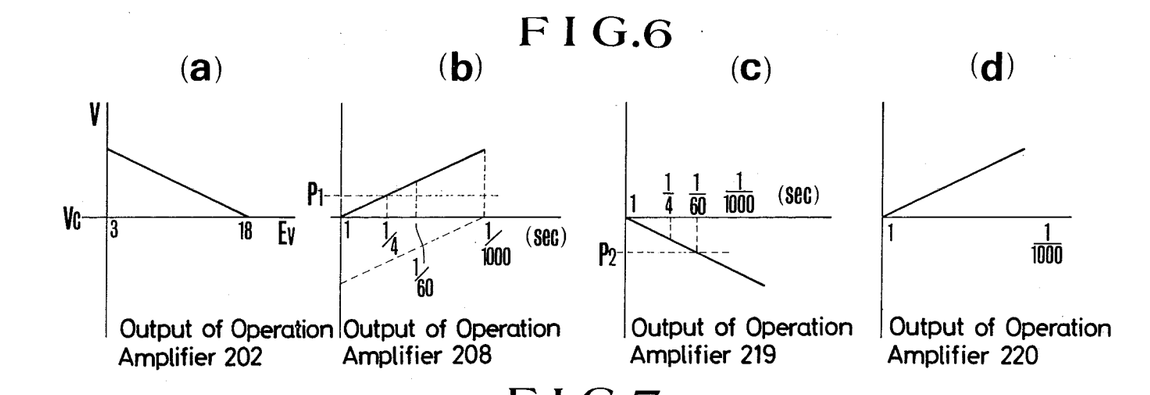
FIG. 6 shows diagrams for explaining the operation of the circuit shown in FIG. 2.

Below the operation of the embodiments in accordance with the present invention shown in FIGS. 1 and 2 will be explained in accordance with FIG. 6. During daylight photography without flash, no charge completion signal is delivered from the flash device to the camera through the contact $a_2$. Thus the control circuit remains in the inoperative state i.e. disabled, and no voltage appears at the points $P_1$ and $P_2$. At this time the electrical potential at the terminal S of the operational amplifier 264 is at a "0" level so that the operational amplifier 264 remains in the inoperative state. In this state the power source switch 230 is closed, all the circuits are brought into the operable state, i.e. enabled in such a manner that the photo voltaic transducing element 201 produces a photoelectric current corresponding to the object brightness. Thus the high input impedance operational amplifier 202 produces an output representing the informatiom logarithmically compressed by means of the logarithmically compressing element 203 as is shown in FIG. 6(a). The above mentioned output assumes a value corresponding to (Bv−Avo−Avc), the resultant of the object brightness (Bv), the smallest F value (Avo) of the lens and the vignetting error (Avc) likely to take place especially when the lens of the light measuring optical system is of a large diameter. The aforementioned output is operated with the information (Sv−Av+Avo+Avc) set at the resistance 207 by means of the operational amplifier 208 in such a manner that the amplifier 208 produces (Bv+Sv−Av), namely the shutter time information Tv as shown in FIG. 6(b).

The aforementioned output appears at the output terminal of the inversing amplifier 220 through the amplifier 213, the inversing operational amplifier 219 and the amplifier 214 and is displayed through the display device 221 as the shutter time. When then the shutter button, not shown in the drawing, is pushed down to the first step, the conventional mirror elevation mechanism and so on, not shown in the drawing, operate. Simultaneously with this operation the normally closed memory switch 223 opens so that the voltage corresponding to the aforementioned information Tv is stored in the memory condenser 222. Further, by means of the member not shown in the drawing, in functional engagement with the mirror elevation lifting the front shutter plane starts to run. The switch 250 opens simultaneously with the running of the front shutter plane. Thus a current, logarithmically extended by means of the transistor 224 corresponding to the voltage memorized in the condenser 222, flows through and the charges condenser 225 up to a certain determined voltage, when the Schmitt-trigger 227 is inversed so as to bring the magnet 228 into the non-excited state so that the rear shutter plane retained by means of the magnet starts to run, thus completing the exposure.

Below the case of the flash photography will be explained. When the contacts $a_1$ and $b_1$ of the flash unit shown in FIG. 1 are connected to the contacts $a_2$ and $b_2$ of the camera shown in FIG. 2 while the power source switches 102 and 230 are closed, the voltage step up oscillation circuit operates, thus charging the condenser 105. When the condenser 105 is charged up to a certain determined voltage the neon tube 112 switches on to display the charge completion. The transistor 113 also brought into the switched on state and transmits the charge completion signal with a level nearly correspondring to the voltage of the power source 101 to the contact $a_1$. Simultaneously the condenser 108 has been charged up to a certain determined voltage so as to store the energy for triggering. When now the switch 251 is connected to the contact (1), the charge completion signal transferred to the contact $a_1$ is transmitted to the illumination diode 231 and the resistor 232 through the contact $a_2$ and the switch 251. Thus the illumination diode lights up to display the charge completion while the base potential of the transistor 237 is raised up. Thus the transistor 237 is brought into the switched on state and consequently the transistors 238, 239 and 240 are also switched on. When the transistors 239 and 240 switched on, a constant current flows through the resistors 241, 242, 243 and 244 via a constant current circuit consisting of FET 245 and 246 and the resistors 247 and 248 thus productincg certain determined voltages at the points $P_1$ and $P_2$. When the values of the aforementioned resistors have been chosen so that a voltage corresponding to a shutter time of ¼ sec. is produced at the point $P_1$ and a voltage corresponding to the shutter time of 1/60 sec. at the point $P_2$ while the operational amplifier 208 delivers an output corresponding to a time longer than the shutter time of ¼ sec., the level of the output of the operational amplifier 208 becomes lower than that of the output at $P_1$ as is shown in FIG. 6 (b). Thus the output at the point $P_1$ is transferred to the operational amplifier 213 through the diode 210 whereby the operational amplifier 219 delivers the inversed output corresponding to the shutter time ¼ sec. as is shown in FIG. 6 (c). Because, however, the output at the point $P_2$ corresponds to the inversed value of the shutter time of 1/60 sec. whose level is lower than that of the inversed output of the shutter time of ¼ sec, the output corresponding to ¼ sec. of the operational amplifier 219 is transmitted to the operational amplifiers 214 and 220 through the diode 211. A voltage corresponding to the shutter time of ¼ sec. is now transmitted to the condenser 222 just as with daylight photography so as to control the shutter with a shutter time in accordance with the aforementioned voltage. Namely the output of the operational amplifier 220 is charged in the condenser 222 through the condenser 223, which is opened by means of the shutter release operation. In functional engagement with the shutter operation the switch 250 opens while the switch 249 closes. Thus the flash light discharge tube 106 is actuated so as to produce a flash light while the shutter is controlled by means of the voltage memorized in the condenser thus obtaining the shutter time of ¼ sec. Furthermore, the charge stored in the main condenser 105 is discharged so as to produce a flash, so that the transistor 113 as well as the transistors 239 and 240 are switched off. Thus the control circuit which automatically switches the shutter time into that suitable for the flash photography is brought into the inoperative state, i.e. disabled. At this time the condenser 222 memorizes the shutter time while the switch 223 is opened so that the shutter time is controlled by means of the value memorized in the memory condenser. Thus even when there is no further charge completion signal the shutter is controlled with a shutter time for flash photography. Further, when in the aforementioned process the operational amplifier 208 produces an output corresponding to a shutter time shorter than 1/60 sec. (FIG. 6(b)), the output of the operational amplifier 208 is transmitted to the circuit in the next step through the diode 209 because the level of the output of the operational amplifier 208 is higher than that of the output at $P_1$. The operational amplifier 219 produces an output inversely proportional to that of the operational amplifier 208, namely an output whose level is lower than that at $P_2$ as is shown in FIG. 6(c). Thus the output of the operational amplifier 220 corresponds to a shutter time of 1/60 sec. and the voltage corresponding to 1/60 sec. is stored in the condenser 222 so as to control the shutter with 1/60 sec. When the operational amplifier 208 produces an output corresponding to a shutter time between ¼ sec – 1/60 sec. the output of the operational amplifier 208 is higher than that at $P_1$ while the output of the operational amplifier 219 is higher than that at $P_2$ so that the shutter is controlled by means of the output of the operational amplifier 208. Further, when the switch 251 is connected to the contact (II) for flash photography the charge completion signal voltage transmitted to the contact $a_2$ is applied to the series circuit composed of the resistor 259, the switch 251 and the resistors 252 and 253 so that the transistors 260 and 261 are switched on. On the other hand the charge completion signal voltage is also applied to the series circuit consisting of the illumination diode 231 and the resistors 259 and 232. Thus the illumination diode 231 lights up to display the charge completion, while the base potential of the transistor 237 assumes a value corresponding to the charge completion signal voltage divided by the resistors 258 and 259. Thus the transistor 237 is not switched on and no voltage appears at the points $P_1$ and $P_2$. When, as mentioned above, the transistors 260 and 261 are switched on the electrical potential at the point $Q_1$ is almost "0" while the electrical potential at the point $Q_2$ becomes nearly same as that of the voltage of the power source 229. Thus the operational amplifier 264 is brought into the operative, i.e. enabled state, a certain determined bias voltage being applied to its terminal S. Meanwhile the operational amplifier 220 is made inoperative, i.e. disabled, no bias voltage being applied to its terminal S. In consequence the output of the operational amplifier 264 is charged in the condenser 222, whereby the value of the resistance 262 has been chosen such that the operational amplifier 264 delivers an output corresponding to the shutter time of 1/60 sec. Thus a voltage corresponding to the shutter time of 1/60 sec. is memorized in the condenser 222 and the shutter time is controlled in the same way as when the switch 251 is connected to the contact (I) regardless of whether there is a charge completion signal from the flash unit or not.

Figure 3:
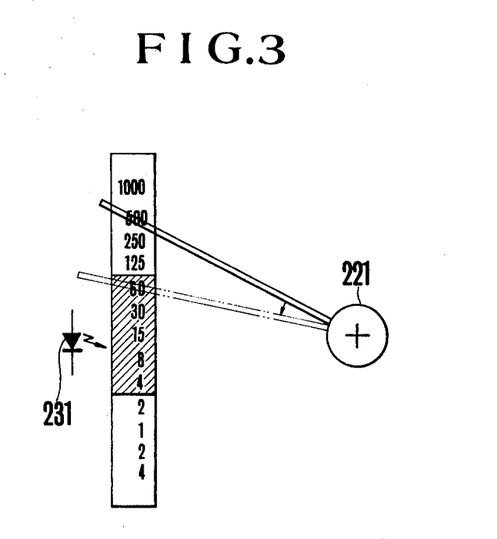
FIGS. 3 and 4 respectively show a display mode of the camera.
Figure 4:
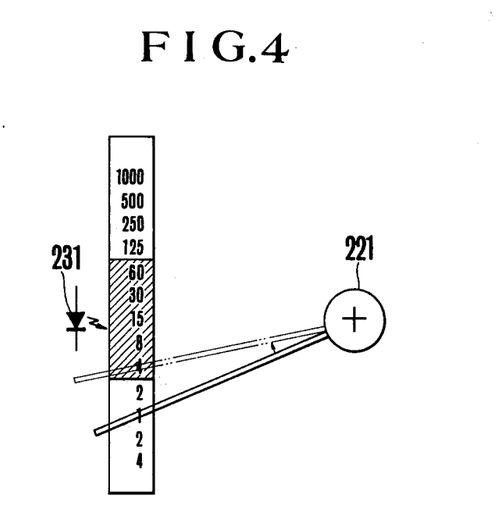
Figure 5:
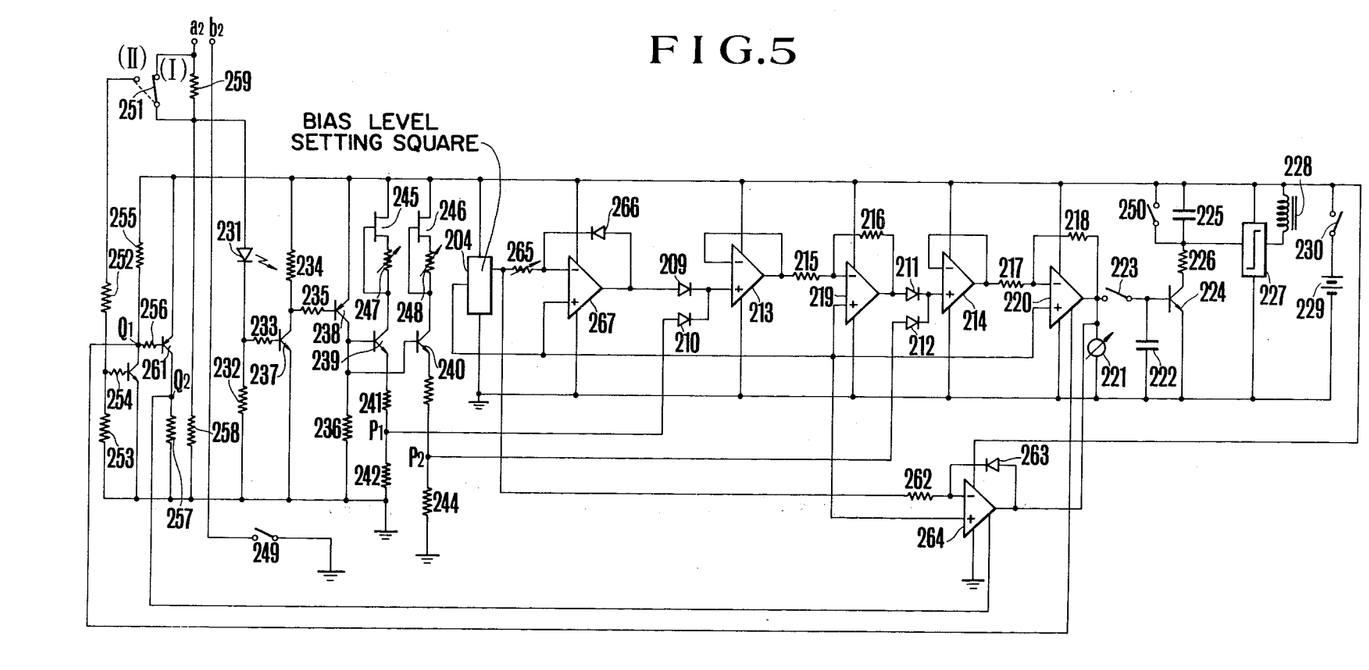
FIG. 5 shows a circuit diagram of another embodiment of the shutter time control circuit in accordance with the present invention.

FIGS. 3 and 4 respectively show the display mode of the aforementioned display meter 221 for flash photography. FIG. 3 shows the display mode when the brightness is high. When the finger of the display meter 221 indicates 500 for 1/500 sec. in the case of daylight photography, the finger indicates 60 for 1/60 sec. in case of flash photography when the charge completion signal reaches the camera side from the flash unit. Simultaneously the illumination diode 231 lights up to illuminate the portion 60 – 4 on the display plate and to show that the device is ready for flash photography. Further, FIG. 4 shows the display mode when the brightness is low. When the finger of the display meter 221 indicates 1 for 1 sec. in the case of the daylight photography, the finger indicates 4 for ¼ sec. in the case of flash photography when the aforementioned switch 251 is connected to the contact (1) an the portion 60 – 4 of the display plate is illuminated by means of the illumination diode as mentioned above. FIG. 5 shows a circuit diagram, at the side of the camera, of an embodiment of the shutter time control circuit in accordance with the present invention, applied to the shutter time priority electronic shutter. The aperture value control circuit is omitted. The circuit shown in FIG. 5 is substantially equal to that shown in FIG. 2, so that the circuit elements whose operations and compositions are same as those of the elements shown in FIG. 2 bear the same figures. What the circuit shown in FIG. 5 differs from that shown in FIG. 2 as follows. Instead of the operational amplifier 208 and the resistors 205, 206 and 207 constituting the light measuring circuit and the operational amplifier shown in FIG. 2 the operational amplifier 267, the shutter time setting variable resistance 260 acting as the input resistance of the aforementioned operational amplifier 267 the value of which resistance is variable in functional engagement with the shutter time dial not shown in the drawing and the diode 266 connected between the input and the output terminal of the operational amplifier 267 so as to compensate the temperature characteristics of the logarithmically extending transistor 224 are provided in the circuit shown in FIG. 5.

Figure 7:
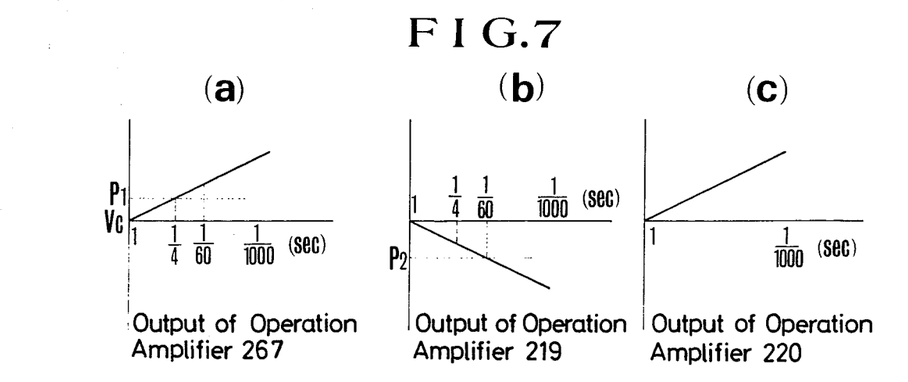
FIG. 7 shows diagrams for explaining the operation of the circuit shown in FIG. 5.

The operation of the embodiment with shutter priority shown in FIG. 5 is explained with respect to FIG. 7. When the power source switch 230 is closed and the desired shutter time is set by means of the shutter time dial not shown in the drawing, the resistance 265 in engagement with the aforementioned dial assumes the value corresponding to the set shutter time. The operational amplifier 267 now produces an output corresponding to the set shutter time as is shown in FIG. 7(a). This occurs in a manner that the voltage corresponding to the set shutter time is memorized in the capacitor condenser the same as with aperture priority shown in FIG. 2 so as to control the shutter. When the switch 251 is connected to the contact (1) for flash photography, the voltage corresponding to the shutter times of ¼ sec. to 1/60 sec. appears at the points $P_1$ and $P_2$ as with the aperture priority shown in FIG. 2. When the shutter time set by means of the shutter time dial not shown in the drawing is longer than ¼ sec. the output at the point $P_1$ is higher than that of the operational amplifier 267 as is shown in FIG. 7(a) in such a manner that the voltage corresponding to the shutter time of ¼ sec. is memorized in the condenser 222 in the same way as in case with priority on the aperture value so as to control the shutter in accordance with the memorized amount. Further, when the set shutter time is shorter than 1/60 sec. the output at $P_2$ assumes the higher than that of the operational amplifier 219 as is shown in FIG. 7(b) and the voltage corresponding to 1/60 sec. the same as with aperture priority is memorized in the condenser 222 so as to control the shutter with 1/60 sec. Further, when the set shutter time is between ¼ sec. and 1/60 sec. the shutter is controlled with the set shutter time in the same way as in case with priority on the aperture value. Further, when the switch 251 is connected to the contact (II) for flash photography, the shutter is controlled with the shutter time of 1/60 sec. predetermined by the resistance 262 the same as with priority on the aperture value. Here the switch 251 is provided on the camera in the embodiments shown in FIGS. 2 and 5, but it goes without saying that it can also be provided on the flash device.

As explained above in detail, the shutter time control circuit in accordance with the present invention is such that the output corresponding to the shutter time suited for the flash light photography is memorized in a memory means, by means of whose output the shutter time is controlled. Hence whether or not there exists a charge completion signal from the flash device it is possible to control the shutter time normally in accordance with the output of the memory means. Also it is possible to take a picture with a long shutter time with flash. This is done by means of the shutter time control circuit for flash photography a system which the shutter time is automatically changed into one for flash photography in accordance with the charge completion signal.

What is claimed is:

1. A camera for flash photography with a flash device delivering a flash preparation completion signal comprising:
   (a) a daylight photography shutter time signal forming circuit for forming a first electrical signal corresponding to the shutter time for the the daylight photography,
   (b) memory means for memorizing the first electrical signal of said daylight photography shutter time signal forming circuit,
   (c) a control circuit for changing the first electrical signal memorized in the memory means to a second electrical signal corresponding to a shutter time value suitable for flash photography in response to the flash preparation completion signal, and
   (d) a shutter time control circuit coupled to the memory means for controlling the shutter time in accordance with the electrical signal in the memory means.

2. A camera system with shutter time control circuit for flash photography comprising:
   (A) a flash device, said flash device including:
      (a) flash means for producing a flash of light
      (b) storing means coupled to the flash means for storing flash energy for the flash means
      (c) store completion signal forming means connected to the storing means to form a store completion signal when a predetermined amount of the flash energy has been stored in the storing means
   (B) a camera, said camera including:
      (a) a daylight photography shutter time signal forming circuit for forming an electrical signal corresponding to the shutter time for daylight photography,
      (b) a flash photography shutter time signal forming circuit coupled to the store completion signal forming means for forming an electrical signal corresponding to a predetermined shutter time in response to the store completion signal,
      (c) a comparison circuit connected to said daylight photography shutter time signal forming circuit and said flash photography shutter time signal forming circuit for comparing the electrical signals from both of said forming circuits to transmit the electrical signal from the flash photography shutter time signal forming circuit when the shutter time corresponding to the electrical signal of said daylight photography shutter time signal forming circuit is longer than the predetermined shutter time corresponding to the electrical signal of the flash photography shutter time forming circuit, and to transmit the electrical signal of the daylight photography when the shutter time corresponding to the electrical signal of said daylight photography shutter time signal forming circuit is shorter than the predetermined shutter time corresponding to the electrical signal of the flash photography shutter time forming circuit,
      (d) memory means coupled to the comparison circuit to memorize the output of said comparison circuit, and
      (e) a shutter control circuit coupled to the memory means to control shutter time based on the electrical signal memorized in said memory means.

3. A camera system with a shutter time control circuit for flash photography comprising:
   (A) a flash device, said flash device including:
      (a) flash means for producing a flash
      (b) storing means coupled to the flash means for storing the flash energy for the flash means
      (c) store completion signal forming means connected to the storming means to form a store completion signal when a predetermined amount of the flash light energy has been stored in the storing means,
   (B) a camera, said camera including:
      (a) a daylight photography shutter time signal forming circuit for forming an electrical signal corresponding to the shutter time for daylight photography
      (b) a flash photography shutter time signal forming circuit coupled to the store completion signal forming means for forming an electrical signal corresponding to a predetermined shutter time for flash photography in response to the store completion signal,
      (c) a selecting circuit including a comparison circuit connected to the daylight photography shutter time signal forming circuit and to the flash photography shutter time signal forming circuit for comparing the signal from the daylight photography shutter time signal forming circuit with the signal from the flash photography shutter time signal forming circuit and selectively delivering the output of the flash photography shutter time signal forming circuit when the signal from the daylight photography shutter time signal forming circuit corresponds to a shutter time longer than the shutter time corresponding to the signal from the flash photography shutter time signal forming circuit, and delivering the output of the daylight photography shutter time signal forming circuit when the signal from the daylight photography shutter time signal forming circuit corresponds to a shutter time shorter than the shutter time corresponding to the signal from the flash photography shutter time signal forming circuit,
      (d) memory means coupled to the comparison circuit for memorizing the electrical signal produced through the selecting circuit
      (e) a shutter time control circuit coupled to the memory means for controlling the shutter time in accordance with the electrical signal memorized in the memory means.

4. A camera system with a shutter time control circuit for a flash photography comprising:
   (A) a flash device, said flash device including:
      (a) a flash means for producing a flash
      (b) storing means coupled to the flash means for storing the flash light energy for the flash means
      (c) a store completion signal forming means connected to the storing means to form a store completion signal when a predetermined amount of the flash light energy has been stored in the storing means
   (B) a camera, said camera including:
      (a) a daylight photography shutter time signal forming circuit for forming a first electrical signal corresponding to daylight photography,
      (b) a first flash photography shutter time signal forming circuit coupled to the store completion signal forming means for forming a second electrical signal corresponding to a predetermined flash photography shutter time in response to the store completion signal (c) a second flash photography shutter time signal forming circuit coupled to the store completion signal forming means for forming a third electrical signal corresponding to a shutter time longer than the flash photography shutter time corresponding to the second electrical signal in response to the store completion signal (d) a comparison circuit connected to the daylight photography shutter time signal forming circuit and the first and the second flash light photography shutter time signal forming circuit so as to compare the outputs of the circuits with each other to deliver the second electrical signal when the shutter time corresponding to the first electrical signal is shorter than the shutter time corresponding to the second electrical signal and to deliver the third electrical signal when the shutter time corresponding to the first electrical signal is longer than the shutter time corresponding to the third electrical signal and also to deliver the first electrical signal when the shutter time corresponding to the first electrical signal is between the shutter time corresponding to the second electrical signal and the shutter time corresponding to the third electrical signal (e) a memory means coupled to the comparison circuit for memorizing the output of the comparison circuit (f) a shutter time control means coupled to the memory means for controlling the shutter time in accordance with the electrical signal memorized in the memory means.

5. A camera system in accordance with claim 4 wherein the daylight photography shutter time signal forming circuit comprising a light measuring circuit for producing an output corresponding to the object brightness.

6. A camera system in accordance with claim 4 wherein the daylight photography shutter time signal forming circuit comprising a setting means for setting the shutter time and an output forming circuit connected to the setting means so as to form an output corresponding to the set shutter time.

7. A camera system with a shutter time control circuit for a flash photography comprising:

(A) a flash device, said flash device including:
  (a) a flash means for producing a flash
  (b) a storing means coupled to the flash means for storing the flash energy for the flash means
  (c) a store completion signal forming means connected to the storing means to form a store completion signal when a predetermined amount of the flash light energy has been stored in the storing means (B) a camera including:
  (a) a daylight photography shutter time signal forming circuit for forming a voltage corresponding to the shutter time for daylight photography
  (b) a switching circuit coupled to the completion circuit operating in response to the store completion signal
  (c) a flash photography shutter time signal forming circuit coupled to the store completion signal forming means including a constant current circuit operating by means of the operation of the switching circuit and a resistance means connected to the constant current circuit whereby a voltage corresponding to the shutter time for flash photography is produced at the resistance means, (d) a comparison circuit connected to said daylight and flash photography shutter time signal forming circuits for comparing the voltages of said both circuits and, when the shutter time corresponding to the voltage of the daylight photography shutter time signal forming circuit reaches a level corresponding to a prescribed shutter time not suitable for flash photography relative to the shutter time corresponding to the voltage of the flash light photography shutter time signal forming circuit, the voltage from said flash photography shutter time signal forming circuit is formed as an output, (e) memory means coupled to the comparison circuit to memorize the output of said comparison circuit, and (f) a shutter time control circuit coupled to the memory means to control the shutter time based on the voltage memorized in said memory means.

8. A camera for flash photography by means of a flash device having a signal terminal for delivering a flash preparation completion signal at the time of flash photography comprising:

(a) a daylight photography shutter time signal forming circuit for forming an electrical signal corresponding to the shutter time for daylight photography (b) a flash photography shutter time signal forming circuit for forming an electrical signal corresponding to the shutter time for flash photography (c) a second signal terminal to be connected to the signal terminal of the flash device (d) a memory means for memorizing the output of said daylight photography shutter time signal forming circuit or the output of said flash photography (e) a selecting circuit connected to the daylight photography and flash photography shutter time signal forming circuits and to the second signal terminal, said selecting circuit having a switching means for connecting the flash photography shutter time signal forming circuit to said memory means, said switching means being operative in response to the presense of the flash preparation completion signal from said second signal terminal whereby the electrical signal from the flash photography shutter time signal forming circuit is memorized in the memory means when the flash preparation completion signal present, and (f) a shutter time control circuit coupled to the memory means for controlling the shutter time in accordance with the electrical signal memorized in the memory means said selector means automatically selecting the flash photography shutter time signal forming circuit in response to the flash preparation completion signal at the time of the flash photography, said memory means memorizing the signal corresponding to the flash photography shutter time, and said memory means controlling the shutter time in accordance with the memorized value so as to obtain a shutter time for flash photography even after the flash light preparation completion signal has disappeared with the operation of the flash light device.

9. A camera in accordance with claim 8 wherein the daylight shutter time signal forming circuit comprising a light measuring circuit for forming an output corresponding to the object brightness.

10. A camera in accordance with claim 8 wherein the daylight shutter time signal forming circuit comprising a setting means for setting the shutter time and a signal forming circuit for forming an output corresponding to the shutter time set by the setting means.

11. A camera for flash photography by means of a flash device delivering a flash preparation completion signal at the time of flash photography comprising:
  (a) a daylight photography shutter time signal forming circuit for forming an electrical signal corresponding to the shutter time for the daylight photography
  (b) a flash photography shutter time signal forming circuit for forming an electrical signal corresponding to a predetermined shutter time for flash photography in response to the flash preparation completion signal
  (c) a comparison circuit connected to the daylight photography and the flash photography shutter time signal forming circuits for comparing the electrical signals of the flash photography shutter time signal forming circuit and daylight photography shutter time signal forming circuit to deliver the electrical signal from flash photography shutter time signal forming circuit when the shutter time corresponding to the output of the flash photography shutter time signal forming circuit is longer than the shutter time corresponding to the output of the daylight photography shutter time signal forming circuit, and delivers the electrical signal from said daylight photography shutter time signal forming circuit when the shutter time corresponding to the output of the flash photography shutter time signal forming circuit is shorter than the shutter time corresponding to the output of the daylight photography shutter time signal forming circuit
  (d) a memory means coupled to the comparison circuit for memorizing the electrical signal delivered through the comparison circuit
  (e) a shutter time control circuit coupled to the memory means for controlling the shutter time in accordance with the electrical signal memorized in the memory means.

12. A camera for carrying out flash photography by means of a flash device delivering a flash light preparation completion signal at the time of the flash photography comprising:
  (a) a daylight photography shutter time signal forming circuit for forming an electrical signal corresponding to the shutter time for the daylight photography;
  (b) a flash light photography shutter time signal forming circuit for forming an electrical signal corresponding to a predetermined shutter time for the flash photography in response to the flash light preparation completion signal;
  (c) a selecting circuit including a comparison circuit connected to the daylight photography shutter time signal forming circuit and to the flash light photography shutter time signal forming circuit so as to compare the output of the daylight photography shutter time signal forming circuit with the output of the flash light photography shutter time signal forming circuit and to selectively deliver the output of the flash light photography shutter time signal forming circuit when the output of the daylight photography shutter time signal forming circuit is an electrical signal corresponding to a shutter time longer than the shutter time corresponding to the output of the flash light photography shutter time signal forming circuit and to deliver the output of the daylight photography shutter time signal forming circuit when the output of the daylight photography shutter time signal forming circuit is an electrical signal corresponding to the shutter time shorter than the shutter time corresponding to the output of the flash light photography shutter time signal forming circuit
  (d) memory means coupled to the comparison circuit for memorizing the electrical signal delivered through the selecting circuit
  (e) a shutter time control circuit coupled to the memory means for controlling the shutter time in accordance with the electrical signal memorized in the memory means.

13. A camera for carrying out the flash photography by means of a flash device delivering the flash light preparation completion signal at the time of the flash photography comprising:
  (a) a daylight photography shutter time signal forming circuit for forming a first electrical signal corresponding to a daylight photography shutter time
  (b) a first flash photography shutter time signal forming circuit for forming a second electrical signal corresponding to a predetermined flash photography shutter time in response to the flash preparation completion signal
  (c) a second flash photography shutter time signal forming circuit for forming a third electrical signal corresponding to a shutter time longer than the flash photography shutter time corresponding to the second electrical signal in response to the flash preparation completion signal
  (d) a comparison circuit connected to the daylight photography shutter time signal forming circuit and the first and the second flash light photography shutter time signal forming circuit for comparing the outputs of the circuits with each other to delivery the second electrical signal when the shutter time corresponding to the first electrical signal is shorter than the shutter time corresponding to the second electrical signal and to deliver the third electrical signal when the shutter time corresponding to the first electrical signal is longer than the shutter time corresponding to the third electrical signal and to deliver the first electrical signal when the shutter time corresponding to the first electrical signal is between the shutter time corresponding to the second electrical signal and the shutter time corresponding to the third electrical signal
  (e) a memory means coupled to the comparison circuit for memorizing the output of the comparison circuit
  (f) a shutter time control means coupled to the memory means for controlling the shutter time in accordance with the electrical signal memorized in the memory means.

14. A camera for carrying out flash photography by means of a flash device delivering a flash preparation completion signal at the time of the flash light photography comprising:
(a) a daylight photography shutter time signal forming circuit for forming an electrical signal corresponding to the daylight photography shutter time;
(b) a flash photography shutter time signal forming circuit for forming an electrical signal corresponding to a predetermined shutter time for flash photography;
(c) a memory means connected to said daylight photography shutter time signal forming circuit for memorizing a delivered electrical signal;
(d) a control circuit coupled to the daylight and the flash photography shutter time signal forming circuits and said memory means for delivering the electrical signal from the flash photography shutter time signal forming circuit to the memory means and interrupting the delivery of the electrical signal from daylight photography shutter time signal forming circuit to the memory means;
(e) a shutter time control circuit coupled to the memory means for controlling the shutter time in accordance with the electrical signal memorized in the memory means.

15. A camera in accordance with claim 14, wherein the control circuit comprises a comparison circuit coupled to the daylight photography shutter time signal forming circuit and the flash photography shutter time signal forming circuit as well as said memory means for comparing the output of the daylight photography shutter time signal forming circuit with the output of the flash light photography shutter time signal forming circuit and transmitting the output of the flash light photography shutter time signal forming circuit to the memory means when the electrical signal from the daylight photography shutter time signal forming circuit does not correspond to a shutter time suited for flash photography.

16. A camera system with the shutter time control circuit for the flash light photography comprising:
(A) a flash light device, said flash light device including;
 (a) a flash light means for producing a flash light
 (b) a storing means for storing the flash light energy for the flash light means
 (c) a store completion signal forming means connected to the storing means so as to form the store completion signal when a certain determined amount of the flash light energy has been stored in the storing means
(B) a camera, said camera including;
 (a) a light measuring circuit for producing an output corresponding to the object brightness
 (b) a flash light photography shutter time signal forming circuit for producing an output corresponding to a certain determined flash light photography shutter time in response to the store completion signal
 (c) a switching circuit connected to the light measuring circuit so as to operate in response to the store completion signal to interrupt the output transmission route of the light measuring circuit
 (d) a memory circuit connected to the flash light photography shutter time signal forming circuit and the output terminal of the switching circuit so as to memorize the outputs of the circuits
 (e) a shutter time control circuit for controlling the shutter time in accordance with the outputs memorized in the memory circuit.

17. A camera system with the shutter time control circuit for the flash light photography comprising:
(A) a flash light device, said flash light device including;
 (a) a flash light means for producing a flash light
 (b) a storing means for storing the flash light energy for the flash light means
 (c) a store completion signal forming means connected to the storing means so as to form the store completion signal when a certain determined amount of the flash light energy has been stored in the storing means
(B) a camera, said camera including;
 (a) a setting means for setting the shutter time
 (b) a shutter time signal forming circuit for forming an output corresponding to the shutter time set by means of the setting means
 (c) a flash light photography shutter time signal forming circuit for producing an output corresponding to a certain determined flash light photography shutter time in response to the store completion signal
 (d) a switching circuit connected to the shutter time signal forming circuit so as to operate in response to the store completion signal to interrupt the output route of the shutter time signal forming circuit
 (e) a memory circuit connected to the flash light photography shutter time signal forming circuit and the output terminal of the switching circuit so as to memorize the outputs of the circuits
 (f) a shutter time control circuit for controlling the shutter time in accordance with the outputs memorized in the memory circuit.

18. A camera system with a shutter time control circuit for the flash light photography comprising:
(A) a flash light device, said flash light device including:
 (a) a flash light means for producing a flash light
 (b) a storing means for storing the flash light energy for the flash light means
 (c) a store completion signal forming means connected to the storing means so as to form the store completion signal when a certain determined amount of the flash light energy has been stored in the storing means
(B) a camera, said camera including:
 (a) a daylight photography shutter time signal forming circuit for forming a first electrical signal corresponding to the daylight photography
 (b) a first flash light photography shutter time signal forming circuit for forming a second electrical signal corresponding to a certain determined flash light photography shutter time in response to the store completion signal
 (c) a second flash light photography shutter time signal forming circuit for forming a third electrical signal corresponding to a shutter time longer than the flash light photography shutter time corresponding to the second electrical signal in response to the store completion signal
 (d) a comparison circuit connected to the daylight photography shutter time signal forming circuit, the first and the second flash light photography shutter time signal forming circuit so as to compare the outputs of the circuits with each other to deliver the second electrical signal when the shutter time corresponding to the first electrical signal is shorter than the shutter time corresponding to the second electrical signal, to deliver the third electrical signal when the shutter time corresponding to the first electrical signal is longer than the shutter time corresponding to the third electrical signal and to deliver the first electrical signal when the shutter time corresponding to the first electrical signal is between the shutter time corresponding to the second electrical signal and the shutter time corresponding to the third electrical signal (e) a memory means for memorizing the output of the comparison circuit (f) a shutter time control means for controlling the shutter time in accordance with the electrical signal memorized in the memory means the first flash light photography shutter time signal forming circuit comprising a switching circuit operating in response to the store completion signal, a constant current circuit operating by means of the operation of the switching circuit and a resistance means connected to the constant current circuit.

* * * * *